United States Patent
Basu et al.

(10) Patent No.: US 7,650,317 B2
(45) Date of Patent: Jan. 19, 2010

(54) ACTIVE LEARNING FRAMEWORK FOR AUTOMATIC FIELD EXTRACTION FROM NETWORK TRAFFIC

(75) Inventors: Sumit Basu, Seattle, WA (US); Karthik Gopalratnam, Mountain View, CA (US); John David Dunagan, Bellevue, WA (US); Jiahe Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 11/567,328

(22) Filed: Dec. 6, 2006

(65) Prior Publication Data

US 2008/0140589 A1  Jun. 12, 2008

(51) Int. Cl.
*G06F 15/18* (2006.01)
(52) U.S. Cl. .......................................... 706/12
(58) Field of Classification Search .................. 706/12
See application file for complete search history.

(56) References Cited

U.S. PATENT DOCUMENTS

| | | | |
|---|---|---|---|
| 4,849,898 A | 7/1989 | Adi | |
| 5,774,845 A | 6/1998 | Ando et al. | |
| 5,963,940 A | 10/1999 | Liddy et al. | |
| 6,076,088 A | 6/2000 | Paik et al. | |
| 6,175,829 B1 | 1/2001 | Li et al. | |
| 6,304,864 B1 | 10/2001 | Liddy et al. | |
| 6,766,316 B2 | 7/2004 | Caudill et al. | |
| 6,766,320 B1 | 7/2004 | Wang et al. | |
| 7,111,002 B2 | 9/2006 | Zhang et al. | |
| 7,185,081 B1 * | 2/2007 | Liao | 709/224 |
| 7,188,168 B1 * | 3/2007 | Liao | 709/224 |
| 7,206,932 B1 * | 4/2007 | Kirchhoff | 713/152 |
| 7,212,301 B2 * | 5/2007 | Treibach-Heck et al. | 358/1.15 |
| 7,296,221 B1 * | 11/2007 | Treibach-Heck et al. | 715/224 |
| 7,376,708 B2 * | 5/2008 | Zubeldia et al. | 709/208 |
| 7,376,755 B2 * | 5/2008 | Pandya | 709/250 |
| 7,415,723 B2 * | 8/2008 | Pandya | 726/13 |
| 7,426,486 B2 * | 9/2008 | Treibach-Heck et al. | 705/32 |
| 7,480,671 B2 * | 1/2009 | Bruening et al. | 707/102 |
| 7,487,264 B2 * | 2/2009 | Pandya | 709/250 |
| 7,508,537 B2 * | 3/2009 | Treibach-Heck et al. | 358/1.15 |
| 7,536,462 B2 * | 5/2009 | Pandya | 709/227 |
| 2004/0111408 A1 | 6/2004 | Caudill et al. | |

OTHER PUBLICATIONS

Data Extraction from Semi-structured Web Pages by Clustering Le Phong Bao Vuong; Xiaoying Gao; Mengjie Zhang; Web Intelligence, 2006. WI 2006. IEEE/WIC/ACM International Conference on Dec. 2006 pp. 374-377 Digital Object Identifier 10.1109/WI.2006.57.*
Automatic Information Extraction in Semi-structured Official Journals Filho, V.M.; Prudencio, R.B.C.; de Carvalho, F.A.T.; Torres, L.R.; Rodrigues, L.; Lima, M.G.; Neural Networks, 2008. SBRN '08. 10th Brazilian Symposium on Oct. 26-30, 2008 pp. 51-56 Digital Object Identifier 10.1109/SBRN.2008.36.*

(Continued)

*Primary Examiner*—Michael B Holmes
(74) *Attorney, Agent, or Firm*—Lee & Hayes, PLLC

(57) ABSTRACT

An active learning framework is provided to extract information from particular fields from a variety of protocols. Extraction is performed in an unknown protocol, in which the user presents the system with a small number of labeled instances. The system then automatically generates an abundance of features and negative examples. A boosting approach is then used for feature selection and classifier combination. The system then displays its results for the user to correct and/or add new examples. The process can be iterated until the user is satisfied with the performance of the extraction capabilities provided by the classifiers generated by the system.

20 Claims, 13 Drawing Sheets

OTHER PUBLICATIONS

Field Extraction Based on Two-level Regulated HMT in Auto Form Processing Xiuling He; Yang Yang; Zengzhao Chen; Ying Yu; Cailin Dong; Intelligent Systems Design and Applications, 2006. ISDA '06. Sixth International Conference on vol. 2, Oct. 16-18, 2006 pp. 716-719 Digital Object Identifier 10.1109/ISDA.2006.253699.*

Fingerprint Extraction of Executables Based on the Potential Field Graph of Callgraph Su Fanchen; Yin Zhiyi; Yao Haitao; Fu Jianming; Zhu Fuxi; Computer Science and Software Engineering, 2008 International Conference on vol. 3, Dec. 12-14, 2008 pp. 974 -977 Digital Object Identifier 10.1109/CSSE.2008.1184.*

K. Tieu and P. Viola, "Boosting image retrieval," in International Conference on Computer Vision, 2000. http://citeseer.ist.psu.edu/tieu00boosting.html.

Y. Freund and R. Schapire. "A short introduction to boosting", , J. Japan. Soc. for Artif. Intel. 14(5) (1999), 771-780. 11 http://citeseer.ist.psu.edu/freund99short.html.

J. Ma, K. Levchenko, C. Kreibich, S. Savage, and G. Voelker: "Unexpected Means of Protocol Inference". Internet Measurement Conference (IMC), 2006, Rio de Janeiro, Brazil.

Ulf Lamping, et al., Ethereal User's Guide. 18189 for Ethereal 0.10.14. http://www.ethereal.com/docs/eug_html_chunked/.

W. Cui, V. Paxson, N. Weaver and R.H. Katz, "Protocol-Independent Adaptive Replay of Application Dialog", Proceedings of the 13th Annual Network and Distributed System Security Symposium (NDSS), San Diego, CA, Feb. 2006. http://www.isoc.org/isoc/conferences/ndss/06/proceedings/html/2006/papers/protocol_independent_replay.pdf#search=%22%22protocol-Independent%20Adaptive%20Replay%20of%20Application%20Dialog%22%22.

Nikita Borisov; David Brumley; Helen J. Wang; Chuanxiong Guo, "Generic Application-Level Protocol Analyzer and its Language", Microsoft Research. Technical Report MSR-TR-2005-133. Feb. 2005.

T. Ashwin, N. Jain, and S. Ghosal, "Improving image retrieval performance with negative relevance feedback", ICASSP, pp. 1637-1640, May 2001. http://ieeexplore.ieee.org/iel5/7486/20374/00941250.pdf?isNumber=.

Peter Anick and Suresh Tipirneni, "Interactive Document Retrieval using Faceted Terminological Feedback", Proceedings of the Thirty-Second Annual Hawaii International Conference on System Sciences-vol. 2— vol. 2, 1999. http://csdl2.computer.org/comp/proceedings/hicss/1999/0001/02/00012036.PDF.

Y. Ishikawa, R. Subramanya, and C. Faloutsos, "Mindreader: Querying databases through multiple examples". In VLDB 1998, pp. 433-438. also available as CMU Technical Report: CMU-CS-98-119, 1998. http://www.informedia.cs.cmu.edu/documents/mindreader.pdf.

Paul Viola and Michael Jones. Rapid object detection using a boosted cascade of simple features. In CVPR, 2001.

* cited by examiner

ACTIVE LEARNING FRAMEWORK FOR AUTOMATIC FIELD EXTRACTION FROM NETWORK TRAFFIC

TECHNICAL FIELD

The subject disclosure relates to automatic extraction of fields from network traffic according to a wide variety of protocols via active learning.

BACKGROUND

Machines communicate with each other through a wide variety of network protocols. Indeed, there are a vast number of actual protocols that are in use at any given time for traffic over any given network. This number is magnified by the variety of implementations and versions of each protocol. For instance, to give a general idea of the complexity of the scope of the issue, a quick survey of five minutes of traffic for two buildings at the same company yielded more than 50 unique protocols.

This diversity of protocols creates a huge headache for any network or systems engineer responsible for understanding the traffic. For instance, if the network engineer is only interested in knowing what filenames are being transported via a filesharing application, perhaps to check for illicit activity, the engineer must find the specification for that protocol and then write code to decode the packets according to the specification. If such specification does not exist, the protocol must somehow be reverse engineered.

While there are tools like Ethereal that are hardwired to understand multiple protocols, there are so many variations and sub-protocols that are constantly evolving with different versions over time that it is difficult for such a tool to cover them all, and also stay up to date over time. At best, the network engineer's code would work for some time, and then require updating later if the protocol changed in any respect.

Furthermore, even where the protocol is known, extracting a particular field of interest can be far from trivial. For instance, even relatively simple protocols have variable length fields, such as strings, which means the field of interest can be an arbitrary offset within the packet flow (e.g., TCP flow). To extract such a field, for instance, requires knowledge of the protocol structure and analysis of other fields to determine the span of the variable length field.

To date, there are some systems that analyze and parse network protocols with varying degrees of automation, but they are inadequate except for certain circumstances. For instance, at least one framework exists that specifies and parses network protocols via hand-written grammars. While the hand-written grammars allow for precise recovery of all protocol elements, the downside is that such a framework requires significant manual effort to precisely describe the entire protocol. While the grammar is sometimes an improvement over creating entirely custom code, given the complexity of the number and kinds of different data and fields over which a network engineer may be held responsible, such an approach is too costly.

In addition, there have been fully automatic approaches that model server responses for various protocols to fool attackers into attempting to exploit vulnerabilities. In a similar vein are systems that classify packet streams into protocols based on learned Markov models. While these more automatic methods are able to fool attackers and identify protocols, respectively, the models they learn are not sufficiently specific to extract arbitrary fields, and they are not protocol-agnostic.

These and other deficiencies of the state of the art of automatic analysis and extraction of data from network traffic will become apparent from the below description of the various exemplary non-limiting embodiments of the invention.

SUMMARY

In consideration of the need for better data field extraction from network traffic, in various non-limiting embodiments, the invention provides automatic extraction of fields from network traffic according to a wide variety of protocols via active learning. In various non-limiting embodiments, an active learning framework is provided to extract information from particular fields from a variety of protocols. Extraction is performed for unknown protocol(s), in which the user presents the system with a small number of labeled instances. The system then automatically generates an abundance of features and negative examples based on the labeled instances. Optionally, a boosting approach is then used for feature selection and classifier combination. The system then displays its results for the user to correct and/or add new examples. The process can be iterated until the user is satisfied with the performance of the extraction capabilities provided by the classifiers generated by the system.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various embodiments of the active learning framework of the present invention are further described with reference to the accompanying drawings in which.

DETAILED DESCRIPTION

Overview

As discussed in the background, current tools available to network administrators and engineers for observing and discerning fields from traffic driven through a network node are inadequate. Either they are too costly from a time and resource standpoint because (expert) humans must become involved with the formulation of a custom analysis over the traffic, or where the tools are automated, they do not allow for sufficiently specific analysis over the traffic to extract arbitrary fields of an identified protocol.

In consideration of the complexity caused by ever evolving different kinds and versions of network protocols, the invention thus provides systems and methods for automatically extracting specific fields, such as text fields, of network protocols via boosting and active learning in a protocol-agnostic manner.

On the application side, the invention approaches the field extraction problem directly—that is, instead of trying to model the network protocols, the invention approaches the problem by detecting field-specific structures within data streams that indicate the fields of interest. On the learning side, the invention implements a feature selection and combination approach, which is incorporated into an active learning framework, thus minimizing the amount of effort that the user must expend in order to achieve a sufficiently accurate classifier.

Active Learning Framework

In various non-limiting embodiments, the invention assists in problems where the user is trying to extract a particular field (i.e., a piece of information) from network traffic according to any of a variety of protocols that may or may not be present in a text stream. One non-limiting scenario in which the invention is effective is where a user does not know how to precisely characterize a field, but can readily provide examples of it (i.e., positive examples) and identify when possible fields suggested by the system are incorrect (i.e., negative examples). Based on the user's examples, an analysis engine provided in accordance with the invention analyzes the traffic, automatically extracts the fields and shows some results to the user. The user can then provide feedback by marking incorrect results and/or providing new examples. The process can continue iteratively and indefinitely until the user is satisfied with the system's performance.

The invention thus applies with great force to a network traffic field extraction scenario, i.e., network engineers often only want to extract a particular field from a protocol, making a full decoding of the protocol neither practical nor necessary. In non-limiting embodiments described herein, for illustrative purposes, a UDP-based protocol is examined where each message is contained in a single packet, but it can be appreciated that the invention applies to any other network protocols, such as TCP flows, as well.

Figure 1:
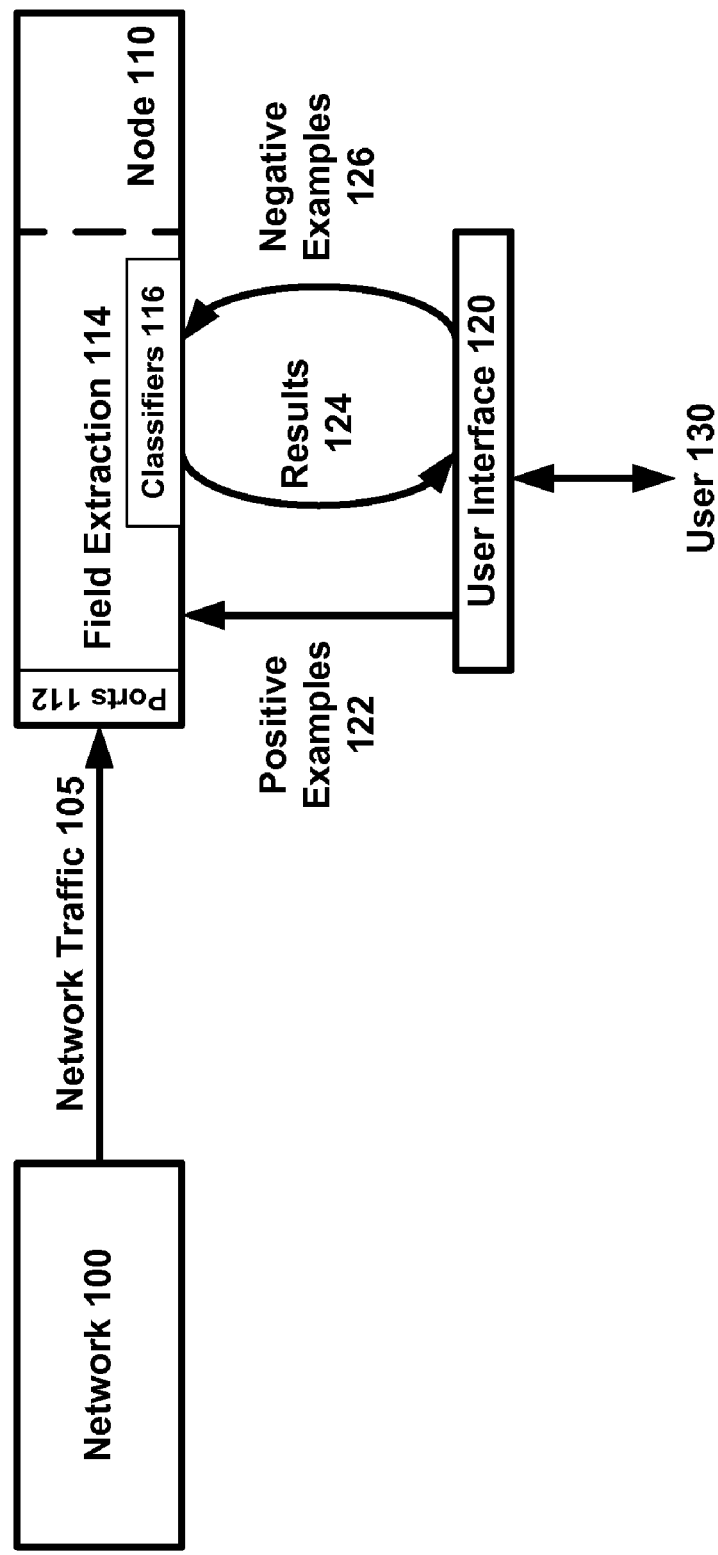
FIG. 1 illustrates a block diagram generally showing an exemplary non-limiting field extraction system of the invention.

FIG. 1 is an exemplary non-limiting block diagram illustrating high level operation of field extraction techniques of the invention. As described in the background, today a variety of traffic 105 may arrive via one or more networks 100 at the various port(s) 112 of a network node 110. As discussed, a user 130 may be interested in extracting only certain fields or kinds of data from the traffic. Through iterative learning, the invention builds one or more classifiers that become progressively better at isolating fields or data of interest in the incoming traffic 105.

Initially, via user interface 120, the user 130 inputs one or more positive examples 122 to a field extraction component 114, or analysis engine, provided in accordance with the invention. Given an example traffic stream, and the designation of a positive example within the stream, the invention operates to infer one or more negative examples, i.e., at position in the traffic stream where the positive example(s) are not. Based on the positive example(s) 122 and the automatically generated negative examples, the invention operates to build one or more classifiers 116 that extract results 124 from the traffic 105 arriving at port(s) 112.

The results 124 are then presented to the user 130, and if satisfactory, the classifiers 116 are deemed effective. At any time, however, if the user 130 decides that the results 124 includes any bad results, then the user 130 can designate one or more results of results 124 as negative examples 126. Based on the negative examples 126, in combination with positive examples 122, new classifiers 116 are formed, and new results 124 are returned to the user 130. At any time, a user can specify new positive examples 122 too. This process repeats until the classifiers 116 are deemed satisfactory by user 130.

Figure 2:
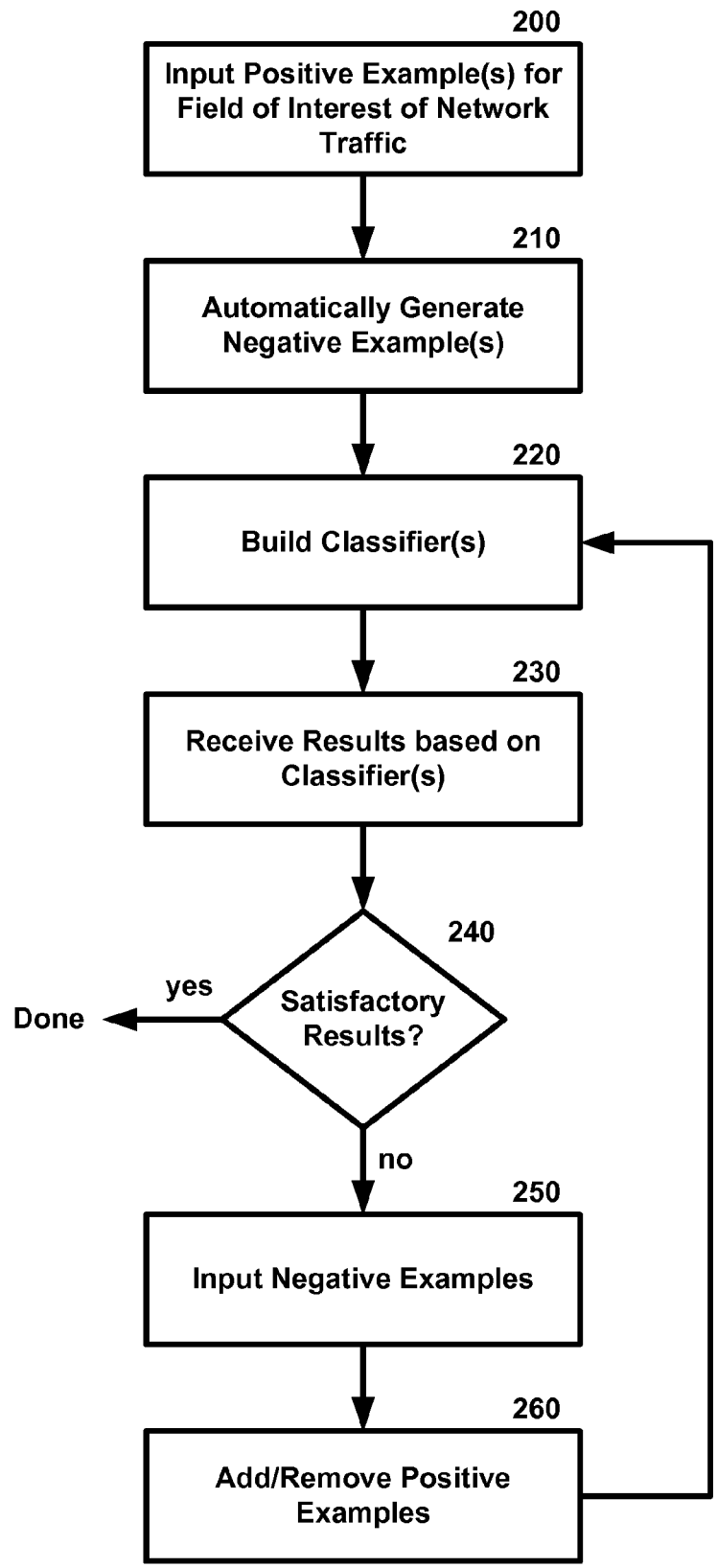
FIG. 2 is a flow diagram generally illustrating an exemplary non-limiting process for automatically extracting data from data streams in accordance with the invention.

The above-described process is illustrated generally in the non-limiting flow diagram of FIG. 2. At 200, a user inputs positive examples for a field of interest in network traffic being received. At 210, based on the positive example(s), the invention automatically generates negative example(s), inferring the negative example(s) from the position of the positive example(s). At 220, the invention operates to automatically build classifiers that extract certain data from the network traffic based on the positive examples received at 200, and the negative examples inferred at 210.

At 230, the classifiers operate to return result data from the network traffic. If it is deemed by the user at 240 that the results are a satisfactory representation of the field of interest in the network traffic, the flow exits. If, however, the user deems the results unsatisfactory because the results include data that is not reflective of the field or data of interest in the network traffic, then at 250 the user can explicitly designate the bad fields returned as negative examples. As a result, new classifiers are formed at 220, and the process repeats iteratively until satisfactory results are obtained. Also, at any time, at 260, additional positive examples can be added (or removed) from the list of positive examples based upon which the classifiers are formed at 220.

In this regard, the invention attempts to directly target the field of interest by learning a classifier. It is also noted, however, that the network engineer wants to do as little labeling as possible, and is unlikely to be willing to label a large number of packets. As a result, it is undesirable to use the typical supervised learning approach, i.e., batch learning a complex classifier on a fixed training set.

To deal with this additional constraint, in various non-limiting embodiments, the active learning framework of the invention advantageously works with as little or as much data as the user is willing to give, often beginning with only a single labeled example. Given a starting point of a dataset of packets from a data flow of interest, e.g., a binary stream, and at least one packet labeled with the field of interest, the system automatically generates negative examples, based on the assumption that all other subranges in that packet cannot be the field of interest. A variety (e.g., dozens or more) of simple candidate features are then proposed that are automatically generated based on the positive examples, each of which results in a simple classifier. A boosting approach is then utilized to perform both feature selection and classifier combination.

Upon convergence, the system returns a set of qualifying subranges based on the classifier(s) it has learned. The user then adds labels by either marking the false positives from that set or adding more positive examples, at which point the system learns a new classifier and brings back new results; these iterations continue until the user is satisfied or the system is unable to improve.

Figure 3A:
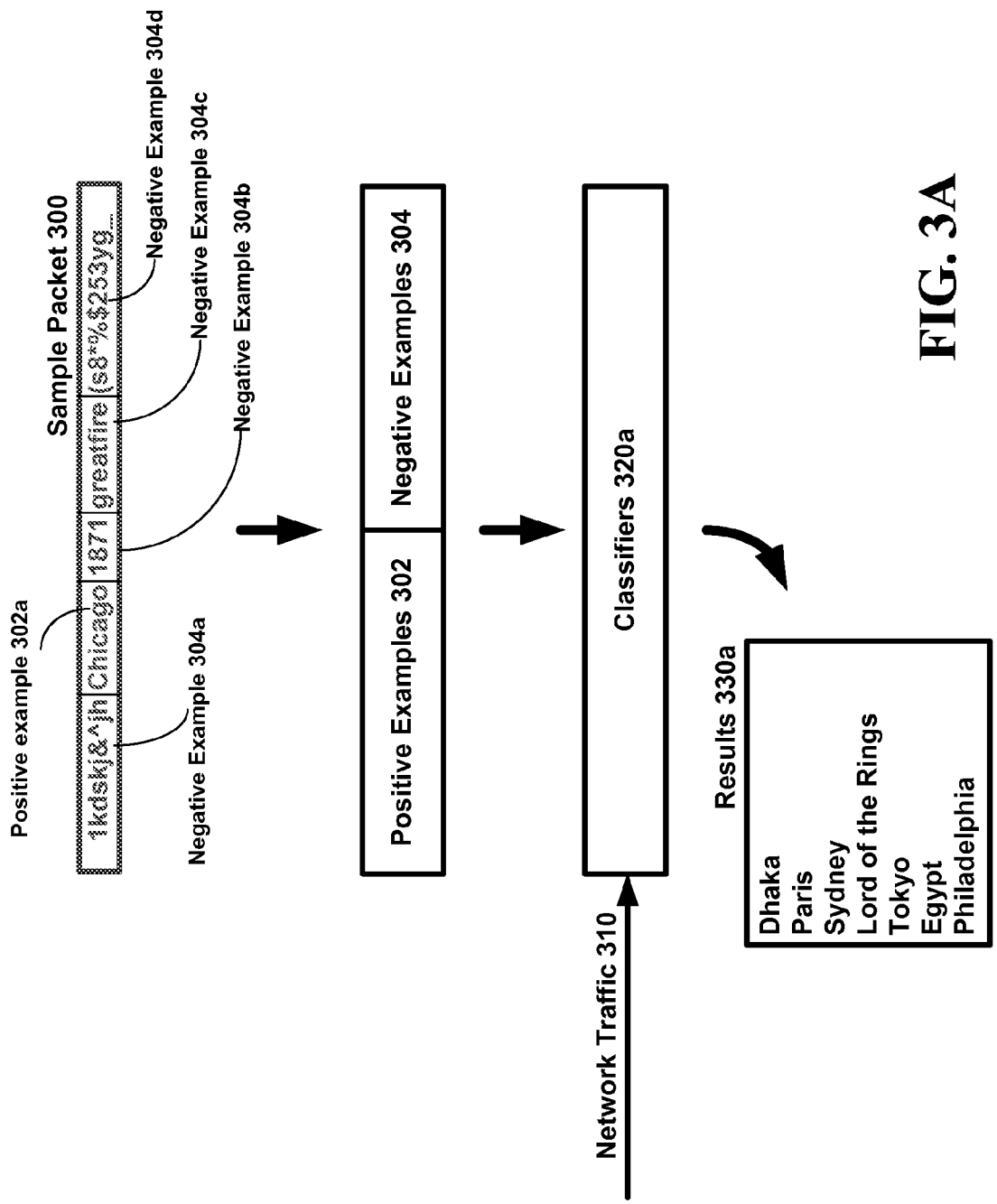
FIGS. 3A, 3B, 3C, 3D and 3E are block diagrams illustrating an exemplary iterative process for extracting data fields from data streams in accordance with the invention.

FIGS. 3A to 3E are block diagrams further illustrate the iterative learning process of the invention for an exemplary non-limiting network traffic analysis scenario. As shown in FIG. 3A, a sample packet 300 is labeled with a positive example 302a, e.g., the network engineer wishes to extract all instances of city names from the network traffic received via a certain port. Thus, the engineer labels "Chicago" as positive example 302a. A variety of negative examples 304a, 304b, 304c and 304d can then be generated where the positive example 302a is not. Negative examples 304a, 304b, 304c and 304d are illustrated for conceptual simplicity, though it can be appreciated that any offset and length that differs from the offset and length of the positive example 302a can be suitable negative examples in accordance with the invention. Collectively, the positive example(s) 302 and negative example(s) 304 are then input to an analysis engine in accordance with the invention, which then proposes simple features from which classifiers 320a are generated.

Figure 3B:
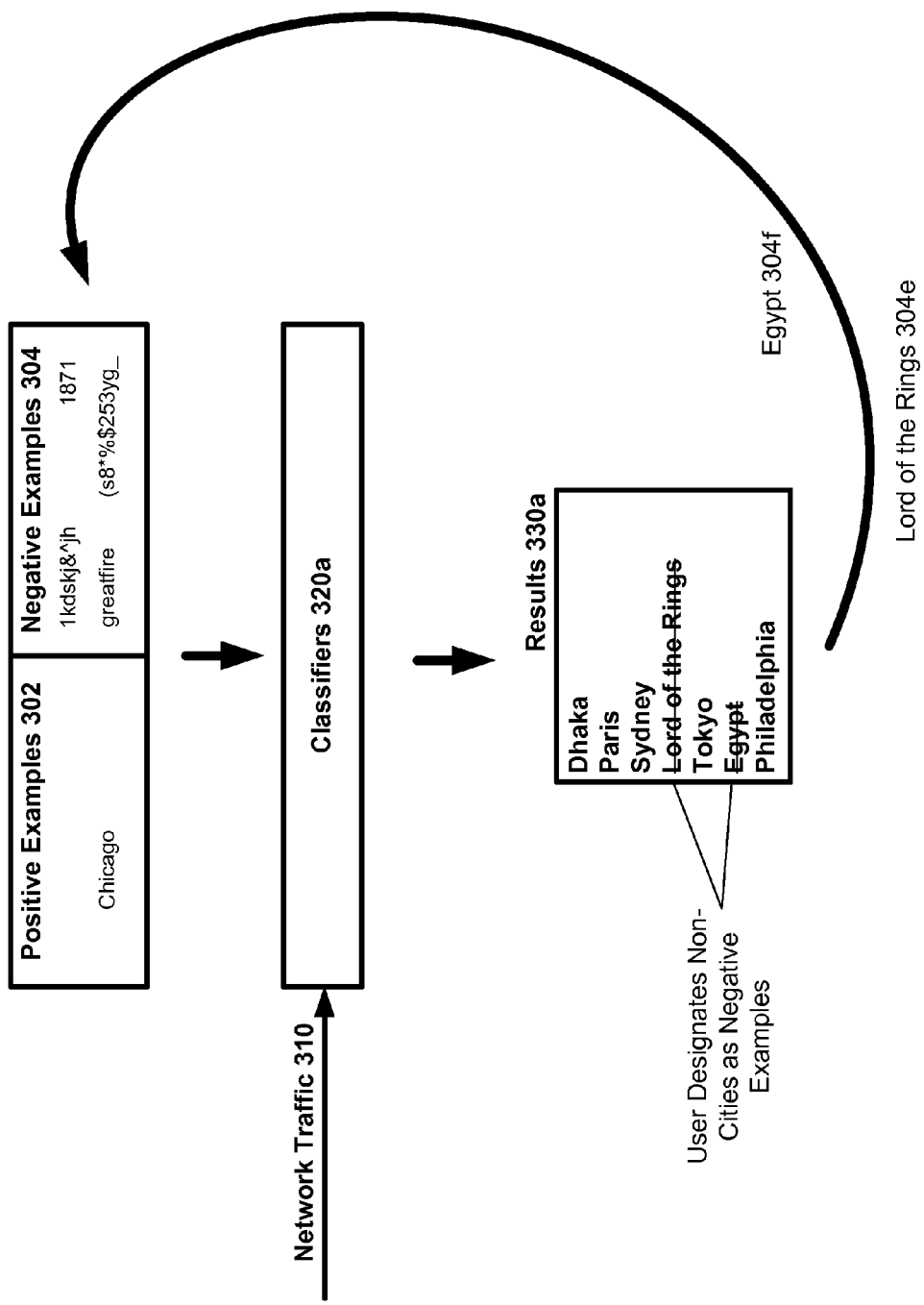

Classifiers 320a are then used to classify traffic 310 to produce results 330a, which are presented to the user. If results 330a are satisfactory for the user's purposes, or if the user has otherwise observed an item for which the user is looking, then the invention has performed satisfactorily and the process completes. However, if more than an acceptable number of errors appear in the results 330a, then as shown in FIG. 3B, the user can designate any errors as such. As shown, classifies 320a picked up "Lord of the Rings" (a movie) and "Egypt" (a country) incorrectly in the result set 330a. As a result of designating these items as incorrect, these items become further negative examples 304e and 304f.

Figure 3C:
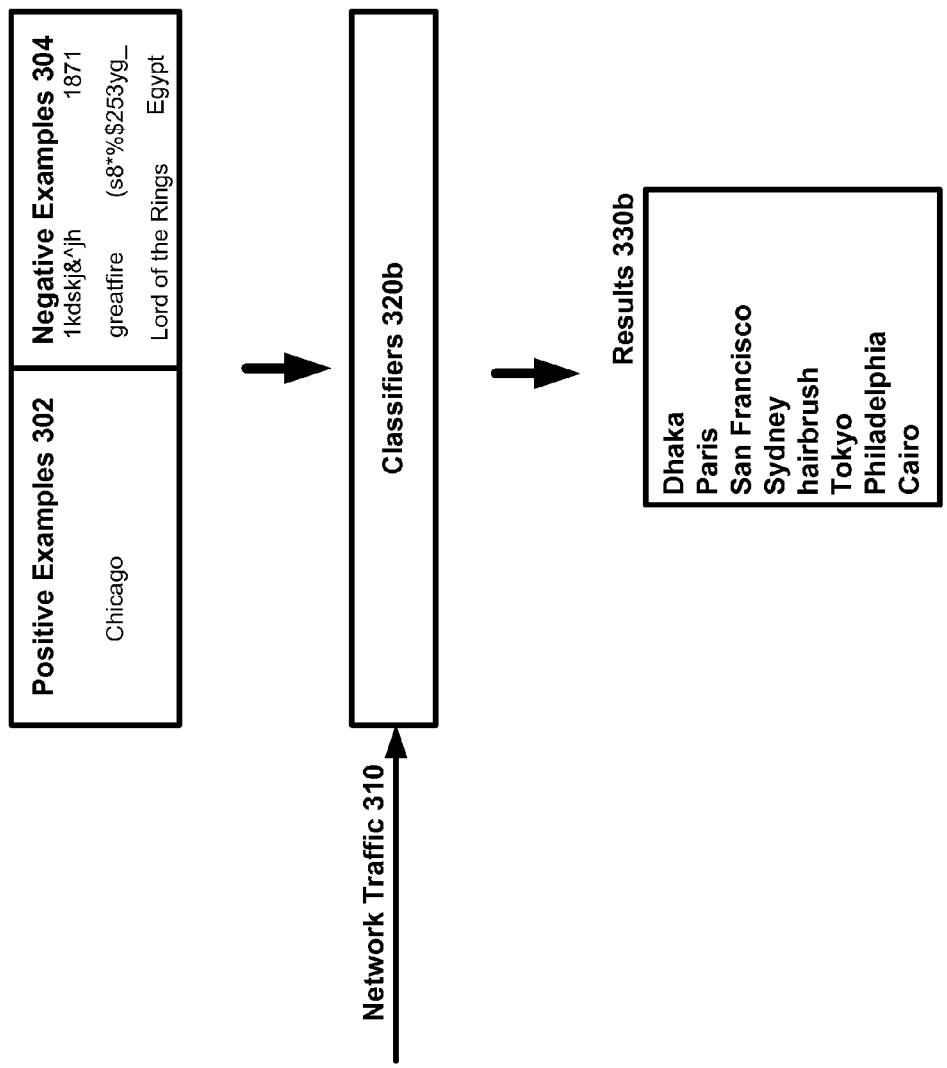
Figure 3D:
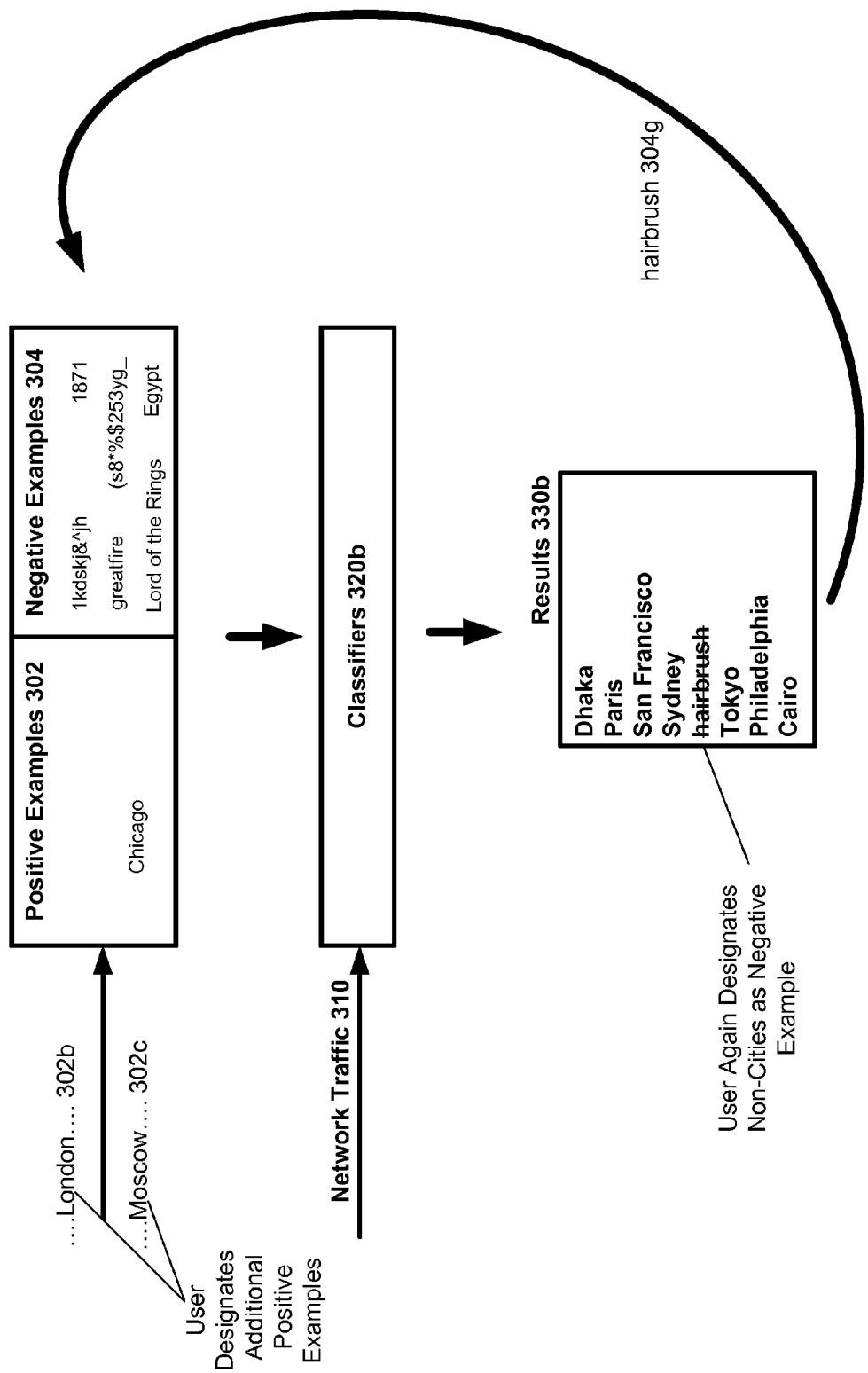

Having added new negative examples 304e and 304f, FIG. 3C illustrates that the invention operates to form a new classifier 320b, which in turn analyzes network traffic 310 to form another result set 330b. This time, only cities are returned in the result set 330b except the anomalous entry "hairbrush." Accordingly, per the iterative learning process of the invention, the user can designate "hairbrush" as another negative example 304g, as shown in FIG. 3D. In addition, feeling dissatisfied that mistakes keep appearing in the results 330a and 330b, the user adds further positive examples 302b (" . . . London . . . ") and 302c (" . . . Moscow . . . ").

Figure 3E:
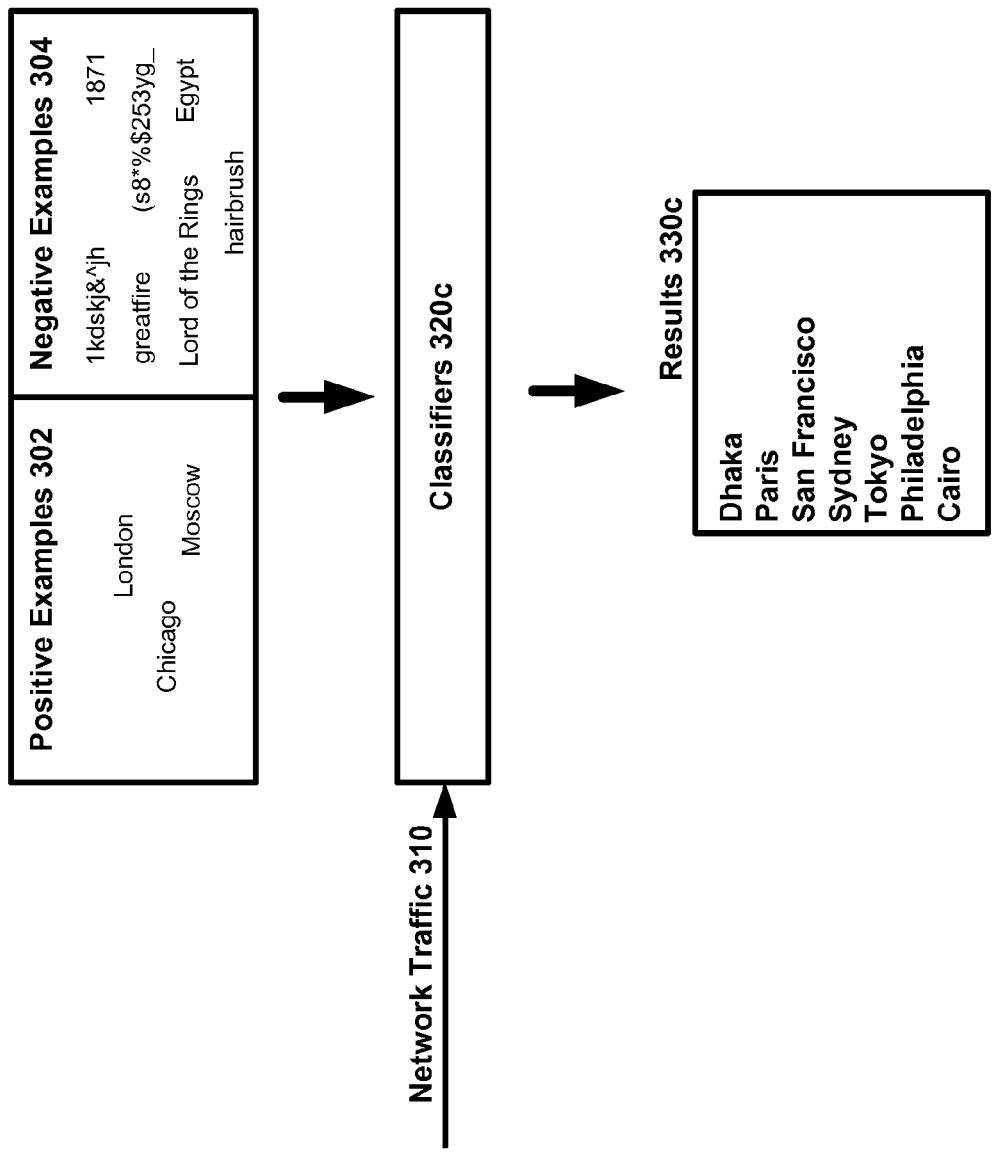

Accordingly, as shown in FIG. 3E, yet another classifier 320c is generated in accordance with the invention based on features generated from the positive examples 302 and negative examples 304. Classifier 320c is then used to again analyze traffic 310, finally providing satisfactory results 330c, which include only city names, as desired. Thus, in just two iterations, providing just three positive examples of a desired field, and with no knowledge of the underlying protocol(s) represented in traffic 310, the invention produces a satisfactory classifier for extracting a city field of interest from traffic 310.

In this regard, with just one iteration, the results of the invention can be quickly observed and increasing the number of iterations helps the network engineer further fine tune the active learning process, achieving perfect or near-perfect extraction on typical fields. Other typical, non-limiting fields for which a network engineer might be looking may include a file extension (e.g., a .pdf file, a C++ file, a .dll library), a filename (e.g., particular malware, pornography files, etc.) or a particular IP address within network traffic. For security or other monitoring reasons, the invention can be used to identify these and other fields of interest in a data stream received via a network.

The active learning and classifier combination approach of the invention is beneficial for at least three reasons. First, it requires less effort from the user, since the user only has to label as many examples as it takes to obtain the level of performance the user desires. Second, the complexity of the classifier scales with the number of labels. If the user labels one example and one of the simple features is sufficient to consistently return the field, only that one feature will have significant weight. On the other hand, if the problem is more complex, more features will be used in the final classifier. In contrast, a classifier of fixed complexity typically requires a fixed amount of labeling to avoid overfitting. Finally, if the network engineer speculates that new families of features might be useful to a given task, the engineer can add these to the learning framework without risking error in performance, even if the features turn out to be useless. Indeed, the mix of possible features can keep growing risk-free over time as people add custom features or feature families, making new problems easier to solve.

In the most general sense, active learning scenarios are those in which the learner can query the user for labels or additional examples, which guide the learner towards a better solution. In accordance with the invention, this paradigm is beneficial when extracting fields from network traffic because such a task is otherwise overly difficult or time-consuming for the user to label a large dataset prior to beginning the learning. The learner of the invention thus performs well with whatever data it has available, and its performance is immediately demonstrable to the user. If the performance is not satisfactory, the system can ask the user to mark its mistakes or add more examples and thus improve its performance. Exemplary non-limiting implementations of the active learning framework for field extraction in accordance with the invention are described in further detail below.

In various exemplary, non-limiting embodiments, the user supplies the system with a small number of packets, possibly just one, in which the user has specified the field of interest by means of an offset and a field length. In addition, she supplies a dataset of packets that are from the protocol of interest. This requires little user effort: simply specifying a server/port allows the system to cull the relevant data from the network.

In a non-limiting implementation of the invention, the system then proposes a large set of features for the classification problem (described in more detail below) and creates a decision stump for every feature. A decision stump is a very simple classifier—for instance, if the feature is Boolean, the decision stump is the feature itself, if the feature is real valued, the decision stump is a simple classifier that provides a mapping from $\Re$ to $\{0,1\}$, i.e., a threshold.

Figure 6:
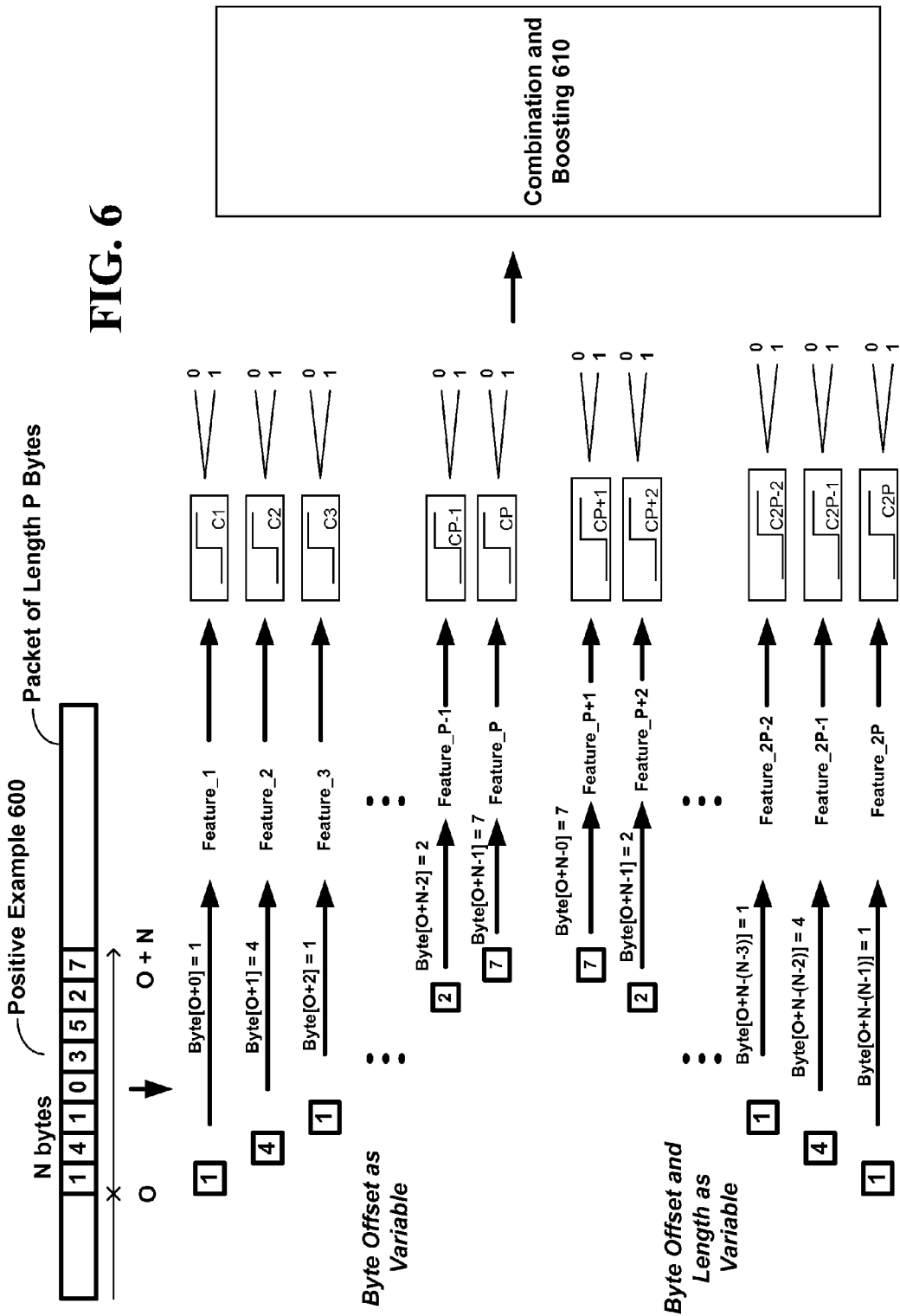
FIG. 6 is a block diagram illustrating an exemplary non-limiting process for spawning a plurality of features from a positive instance of a field of interest in accordance with the invention.

This process is illustrated in exemplary non-limiting fashion in the block diagram of FIG. 6. Given a positive example 600 from a packet of P bytes with the field of interest having an offset O and length N, in one non-limiting embodiment of the invention, a plurality of features Feature_1 to Feature_R are generated by applying byte equality to various positions relative to the start/end of the positive example 600, as shown. Then, classifiers C1 to CR are formed from each of the features. Then, the classifiers C1 to CR can be combined and boosting (weighting) 610 can be applied to form the most effective extractor of the relevant data given the positive example 600. Boosting can be used to combine weak classifiers, reweighting data, and repeating until the best classifier is formed. In FIG. 6, byte equality is shown as a feature template, i.e., 'byte[X]==Y" is used as a simple feature for a set of 2P features. For the first set of P features, 'byte[offset+i]=Y' is used as a feature for i from -offset to P-offset, and for the second set of P features, 'byte[offset+length+i]=Y' is used as a feature for i from -offset-length to P-length-offset. In the example shown, each feature is a binary classifier (i.e., 1 or 0) though one can appreciate that any Boolean operator, or any other function f(X), can be designated as a feature from which a corresponding classifier can be formed in accordance with the invention. In addition, where combinations of different byte equalities are considered, the number of features grows considerably.

The system of the invention also generates a large number of negative examples. This is a relatively easy task given that the user has provided only one correct answer per packet, so all other offset/length pairs are guaranteed to be negative examples. Generally, however, using all of the negative examples is cumbersome, and thus, optionally, negative examples can be drawn randomly from the overall set. In addition, some examples are specifically included that draw a particularly sharp contrast with the positive examples. In the case of a field offset and length specified as part of a positive examples, specifically, a negative example is formed that includes the correct offset of a labeled packet but that also uses an incorrect length. Similarly, an incorrect offset can be selected, while choosing a length such that it terminates at the same location as the true field of the positive example. This, in effect, allows the system to focus on different features of desired field of network traffic in order to form more targeted classifiers.

In this regard, these "almost correct" negative examples prevent the system from overfitting to characteristics of a small number of labeled examples. For example, if byte[0] of the field is always 255, the system may propose that this feature is enough to determine the field, regardless of the length—simply because it has seen no negative examples where this feature is true and yet the field is not correctly extracted.

At this point, having input positive examples and having automatically selected a number of negative examples, the feature selection and combination process of the invention can start. In a typical boosting scenario, the same classifier is trained (e.g., a simple hyperplane) over and over again, reweighting the individual data points and learned classifiers on each iteration. However, in accordance with the invention, there are a large number of classifiers from which to choose, each based on a simple feature.

At each boosting step, the best of these features/classifiers is chosen, i.e., the classifier is chosen that will most improve the classification accuracy on the weighted data. The resulting classifier is then weighted according to standard boosting practices, although it is noted that there are several variants of boosting, each of which may be used in accordance with the invention, and each of which has a slightly different weighting scheme. The invention thus performs both feature selection (by choosing the best classifier at each step) and feature combination (via the weighted combination from boosting). Due to the relative bias in the number of positive vs. negative examples, the weight of the data points is then scaled relative to the number of examples in each class.

The system then classifies all possible candidate packets and fields therein using the learned classifier, and returns the instances that are classified as correct fields. It is noted that this is an expensive operation—i.e., there are $O(N^2)$ possible fields in a packet of length N: all offsets and all lengths for each offset. For instance, identifying the field of interest from 10,000 packets of average length 100 would involve $5*10^7$ classifications (more efficient methods are described in more detail below).

The user can then provide feedback on the extracted fields in two ways—the user can provide negative examples, e.g., by identifying some of the extracted fields as wrong, or provide more positive examples if the recall rate is perceived to be too low. These active learning steps are repeated until the user receives satisfactory results.

With respect to feature generation, in a non-limiting embodiment of the invention, the learner's feature proposal process for field extraction is agnostic to the actual protocol. The proposed features can take a number of forms. The simplest of these is the case where each feature corresponds to whether or not a byte relative to the field location takes on a particular value. However, proposing a separate feature for each byte taking on each value in the range {0 . . . 255} may be prohibitive.

Figure 4:
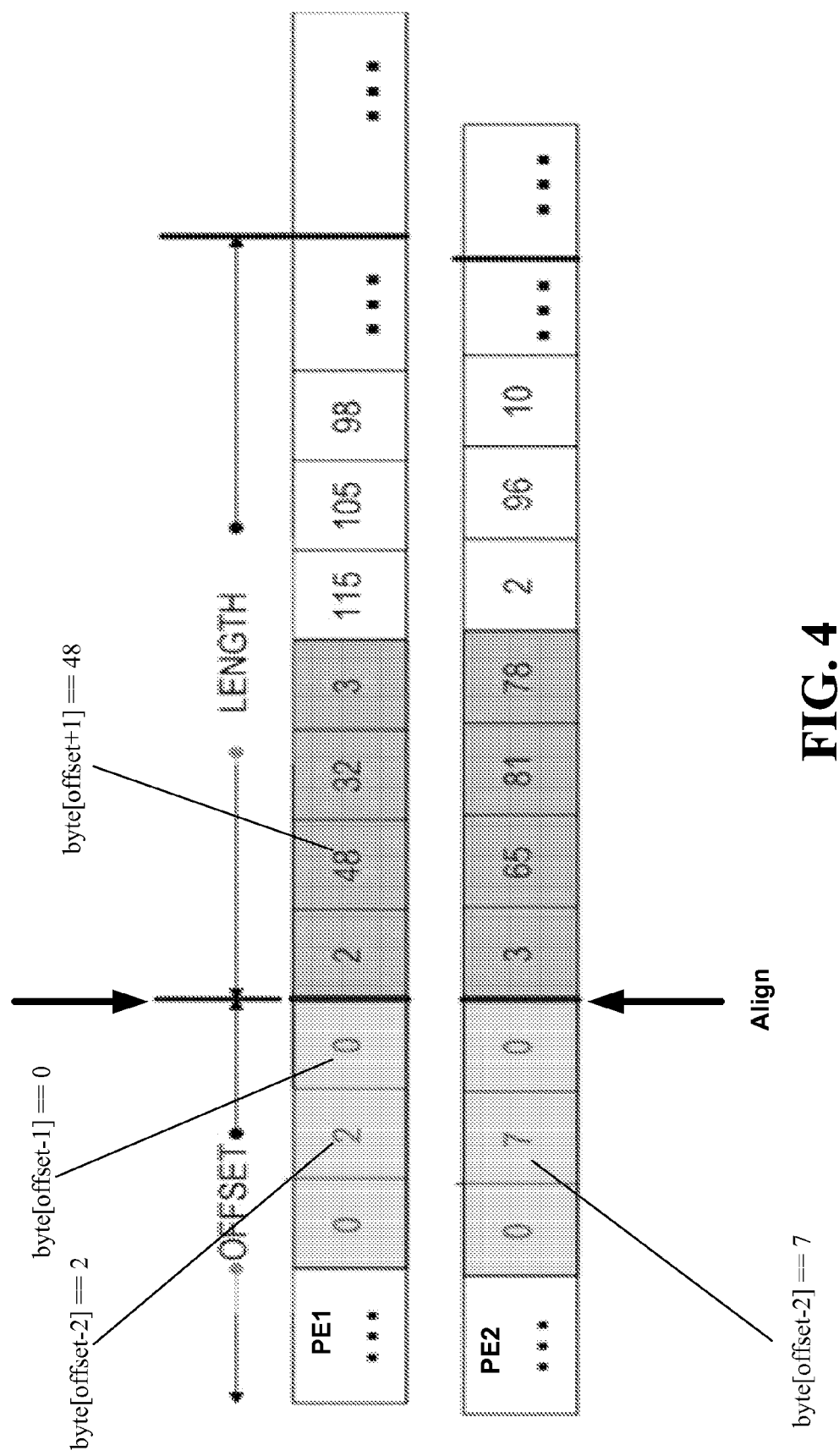
FIG. 4 illustrates exemplary alignment of data packets based the start and/or end of a data field provided as a positive example in accordance with the invention.

Instead, in one embodiment of the invention, the positive examples provided by the user are used as a guide to propose the single byte features in the following manner. First, as shown in FIG. 4, at least two positive field examples are aligned along the start of the fields. Then, this alignment is used to propose features corresponding to each byte value within some window (e.g., ±10 bytes) around the beginning of the field. For example, in FIG. 4, the presently described embodiment of the invention proposes features such as "byte[offset−1]==0", "byte[offset−2]==2", "byte[offset−2]==7", "byte[offset+1]==48" and so on, where offset (a variable) is the starting position of the field for the given packet. In this regard, it is noted that offset and length are both variables and may be different for different packets. For each feature, a simple classifier is then generated which can be used to extract data from an arbitrary stream adhering to the same protocol (whatever protocol it might be) as the positive examples.

Then, the same process can be performed for the end of the field (i.e., the ends of the positive field examples are aligned, and then features are proposed around offsets from the aligned ends). While the invention is not so limited, in an evaluation of traffic adhering to the DNS protocol, the above-described embodiment for feature proposal and generation performed very well. In addition to these single byte equality features, there are a number of other features that can be proposed, e.g., for more complex protocols.

Figure 5:
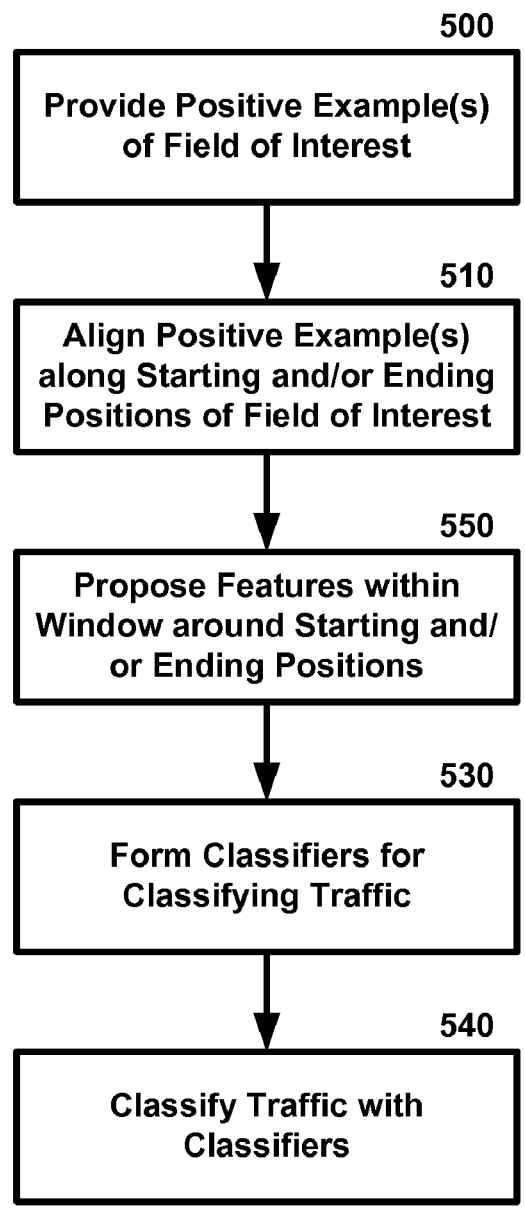
FIG. 5 is a flow diagram generally illustrating an exemplary non-limiting process for aligning positive examples to form features and classifiers in accordance with the invention.

FIG. 5 is an exemplary non-limiting flow diagram showing the generation of classifiers in accordance with the invention for use in connection with extracting a field of interest from an arbitrary data stream by providing positive example(s) as in the above-described exemplary non-limiting implementation of the invention. At 500, a user provides positive example(s) of a field of interest by designating "correct" data fields in one or more samples. At 510, the samples are aligned at the starting positions and/or the ending positions of the correct data fields. At 520, a variety of features are proposed based on the alignment, which are then translated to classifiers at 530. Then, at 540, the classifiers are ready for extraction of fields from an arbitrary stream adhering to the format of the positive examples, whatever format that may be. The above-described user interactive process can then be used to further refine the results produced by the classifiers by adding further positive examples and/or by explicitly identifying negative examples.

Exemplary Non-Limiting Scenarios

As a sample scenario, the system of the invention can be used to extract fields from the domain name service (DNS) protocol, using traces collected from a gateway router at a network node. The DNS queries and responses can be separated and the system can be used to extract the domain name from DNS queries, and the returned IP address from the DNS responses.

While DNS is a relatively simple protocol, as discussed, being able to extract these in a completely protocol agnostic fashion is a benefit of the invention. The domain name in the DNS query is an example of a variable length field in a binary protocol, which makes for an interesting case, since a classifier has to somehow find the bounds of the field. In the case of the IP address in the DNS response, there can be multiple responses following the variable length query (the query is repeated in the response). Using only the above-described simple byte-equality features based on lining up the positive examples for classification, the invention performs efficaciously.

With respect to performance vs. number of training examples, it is observed that the number of positive and negative examples has an effect on the accuracy of the classifier(s) generated. For illustrative purposes only, this effect was measured by training the boosting algorithm on varying numbers of positive and negative examples, and testing them on a test set of 1,000 positive examples (a subrange corresponding to a field) and 1,000 negative examples (a subrange not corresponding to a field) from DNS queries.

Figure 7:
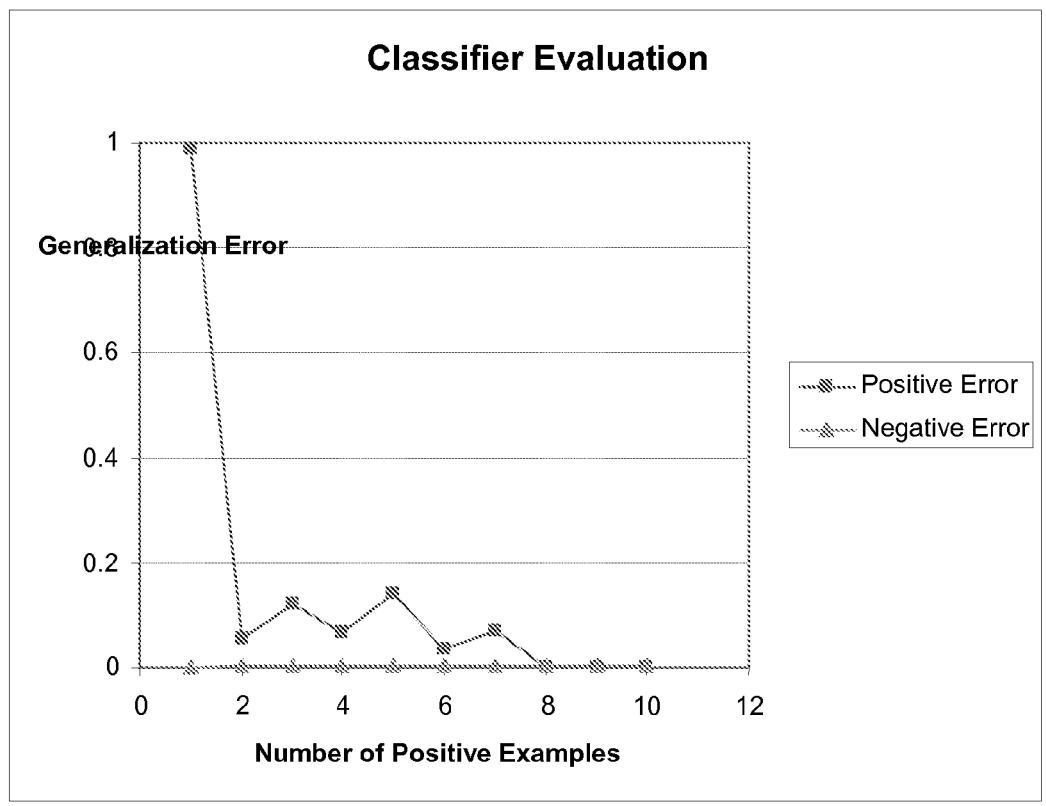
FIG. 7 is an exemplary graph illustrating performance of the invention relative to the number of positive examples provided by a user in accordance with the invention.

FIG. 7 shows the percentage errors of the classifier vs. the number of positive examples, averaged over 20 sets of 200 randomly selected negative examples. The plot shows the error rates on the positive and negative instances. In this example, as shown in the graph of FIG. 7, the error dropped to zero after labeling less than ten examples, which implies minimal effort from the user. Similar performance was observed on the DNS responses. Also, the algorithm was not observed to be particularly sensitive to the number of random negative training examples, i.e., varying the number of random negative examples yielded similar curves on the testing set.

In an exemplary non-limiting trial, the actual features identified by the classifier(s) generated in accordance with the invention were observed based on a set of 10 positive examples and 10 sets of 1,000 randomly generated negative examples, and a list of the selected features and their average weight was generated. Table 1 below, for instance, shows the top six features with the highest weight.

TABLE 1

Top six important features for identifying a trial DNS query

| FEATURE | WEIGHT |
| --- | --- |
| byte[offset + length + 5] == 1 | 4.52919 |
| byte[offset − 7] == 1 | 3.304362 |
| byte[offset + length − 8] == 116 | 3.213337 |
| byte[offset − 10] == 1 | 3.184982 |
| byte[offset + 7] == 73 | 1.851104 |
| byte[offset + 26] == 67 | 1.483588 |

For instance, the above table indicates that the most important features or predictors are that five bytes after the candidate field, the byte value is '1' and that seven bytes before the offset, the byte value is '1.' In reality, the DNS query of the trial always starts after the header, (which has a '1' seven bytes before the start of the query field), and the first '0' indicates the end of the query. However, several bytes after the final delimiting '0' are constant, and thus were effective in finding the end of the query, explaining the high weight for the first feature.

A histogram of the various byte values in DNS queries helps to understand why the final delimiting '0' was not a highly weighted feature. The histogram showed a disproportionate number of '0's. Therefore, with a relatively high probability, the randomly chosen negative examples contained instances where the byte after the candidate field was a '0', thereby lowering the weight of that feature during classification training. This does not particularly detract from the performance of the invention for the DNS queries/responses case, but for more complex protocols, it could be important to find the exact features that delimit the field of interest.

It is also helpful to understand how the invention performs with respect to false positives while actually searching through a set of given packets for the field of interest. To demonstrate the efficacy of the invention with respect to false positives, an exemplary non-limiting trial was performed based on a set of 100 packets with the DNS query field. Then, every possible candidate field (i.e. every possible combination of offset and length) was generated for each of these packets, and using a learned classifier, each of these candidate fields was classified. Then, the number of packets was counted for which the classifier correctly extracted (and only extracted) the query field. This evaluation was done for either two or four positive examples, and then repeated over 20 sets of 200 randomly selected negative examples. The extent to which the search for the field of interest among all the candidate packets is likely to yield false positives was observed from the results, as shown in Table 2 below, listing the number of packets with exactly one query field found during exhaustive enumeration of fields.

TABLE 2

Extent of False Positives

| Num. Positive Training Instances | Avg. Num. Packets Correctly Marked | Max. Num. Packets Correctly Marked | Min. Num. Packets Correctly Marked |
| --- | --- | --- | --- |
| 2 | 70 | 95 | 42 |
| 4 | 86 | 100 | 68 |

As observed over multiple runs of the classification algorithm of the invention, there can be a high degree of variance in the number of packets that are marked correctly. This is owing to the fact that the random set of negative training examples may not contain examples of the type that resolve the ambiguity that is reflected in these misclassifications. This underlines the promise of the active learning framework; mistakes can be rectified by adding the misclassified fields as negative examples for the next active learning iteration.

In one non-limiting embodiment, a greater weight is ascribed to the user-labeled negative examples relative to the randomly generated negative examples, since otherwise these specific examples may not generate enough of a penalty for misclassification during training, and therefore be effectively ignored. In addition, the weights can be iteratively increased until the classifier either gets these examples correct or can no longer improve its performance. Accordingly, by making better use of negative examples, errors can be driven down to lower levels.

In other non-limiting embodiments of the invention, the invention optimally chooses which labels the system presents to the user for labeling, given that some are more ambiguous than others (i.e., closer to the decision boundary), and thus more likely to benefit from user feedback.

The above-described techniques of the invention can be extended in a number of ways. For instance, one extension of the invention includes applying a "feature cascade" to efficiently filter the input with successive passes of the component features instead of enumerating all possible subpackets, for instance, as described in exemplary fashion in Paul Viola and Michael Jones, "Rapid Object Detection using a Boosted Cascade of Simple Features" IEEE, 2001. Second, with knowledge of the cost to the user of labeling negative examples vs. adding more data, the invention can be tailored in terms of the right amount of user effort as well as classifier performance in a given implementation. In addition, the invention can be generalized as a way to automatically extract the structure of a protocol, i.e., if extractors can be learned for a number of tokens in a protocol, a model can be built for how these tokens relate to each other.

There are also a number of application specific objectives that can be achieved using the invention. For instance, one may want to extract the filenames of files sent over the network to enforce company policies, debug distributed systems problems related to particular field values, track the content of traffic to particular servers to understand their usage for management purposes, or identify whether applications with known vulnerabilities are being used on the network.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with extracting data of interest from data streams in accordance with the present invention.

The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. Arbitrary and large amounts of data can come from any source, and thus the techniques for extracting data of interest from large amounts of data beyond human analysis in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for extracting data in accordance with the invention.

Figure 8:
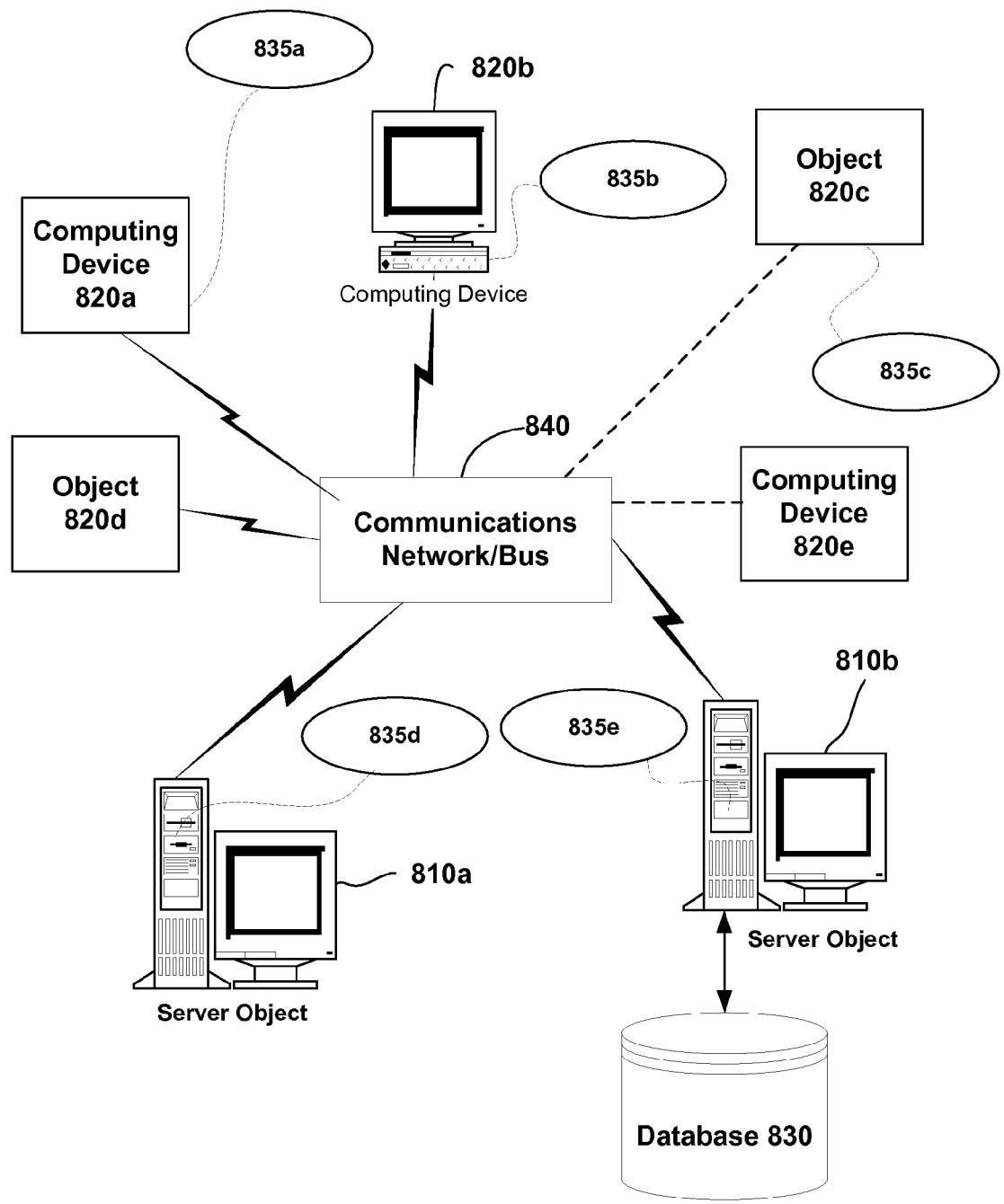
FIG. 8 is a block diagram representing an exemplary non-limiting networked environment in which the present invention may be implemented.

FIG. 8 provides a schematic diagram of an exemplary networked or distributed computing environment. The distributed computing environment comprises computing objects 810*a*, 810*b*, etc. and computing objects or devices 820*a*, 820*b*, 820*c*, 820*d*, 820*e*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 840. This network may itself comprise other computing objects and computing devices that provide services to the system of FIG. 8, and may itself represent multiple interconnected networks. In accordance with an aspect of the invention, each object 810*a*, 810*b*, etc. or 820*a*, 820*b*, 820*c*, 820*d*, 820*e*, etc. may contain an application that might make use of an API, or other object, software, firmware and/or hardware, suitable for use with the systems and methods for extracting data from data streams in accordance with the invention.

It can also be appreciated that an object, such as 820*c*, may be hosted on another computing device 810*a*, 810*b*, etc. or 820*a*, 820*b*, 820*c*, 820*d*, 820*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to extracting data from data streams according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 8, as an example, computers 820a, 820b, 820c, 820d, 820e, etc. can be thought of as clients and computers 810a, 810b, etc. can be thought of as servers where servers 810a, 810b, etc. maintain the data that is then replicated to client computers 820a, 820b, 820c, 820d, 820e, etc., although any computer can be considered a client, a server, or both, depending on the circumstances. Any of these computing devices may be processing data or requesting services or tasks that may implicate the extracting data from data streams in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for extracting data from data streams of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 8 illustrates an exemplary networked or distributed environment, with server(s) in communication with client computer(s) via a network/bus, in which the present invention may be employed. In more detail, a number of servers 810a, 810b, etc. are interconnected via a communications network/bus 840, which may be a LAN, WAN, intranet, GSM network, the Internet, etc., with a number of client or remote computing devices 820a, 820b, 820c, 820d, 820e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to extract data of interest from arbitrary data streams.

In a network environment in which the communications network/bus 840 is the Internet, for example, the servers 810a, 810b, etc. can be Web servers with which the clients 820a, 820b, 820c, 820d, 820e, etc. communicate via any of a number of known protocols such as HTTP. Servers 810a, 810b, etc. may also serve as clients 820a, 820b, 820c, 820d, 820e, etc., as may be characteristic of a distributed computing environment.

As mentioned, communications may be wired or wireless, or a combination, where appropriate. Client devices 820a, 820b, 820c, 820d, 820e, etc. may or may not communicate via communications network/bus 14, and may have independent communications associated therewith. For example, in the case of a TV or VCR, there may or may not be a networked aspect to the control thereof. Each client computer 820a, 820b, 820c, 820d, 820e, etc. and server computer 810a, 810b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 810a, 810b, 820a, 820b, 820c, 820d, 820e, etc. may be responsible for the maintenance and updating of a database 830 or other storage element, such as a database or memory 830 for storing data processed or saved according to the invention. Thus, the present invention can be utilized in a computer network environment having client computers 820a, 820b, 820c, 820d, 820e, etc. that can access and interact with a computer network/bus 840 and server computers 810a, 810b, etc. that may interact with client computers 820a, 820b, 820c, 820d, 820e, etc. and other like devices, and databases 830.

Exemplary Computing Device

Figure 9:
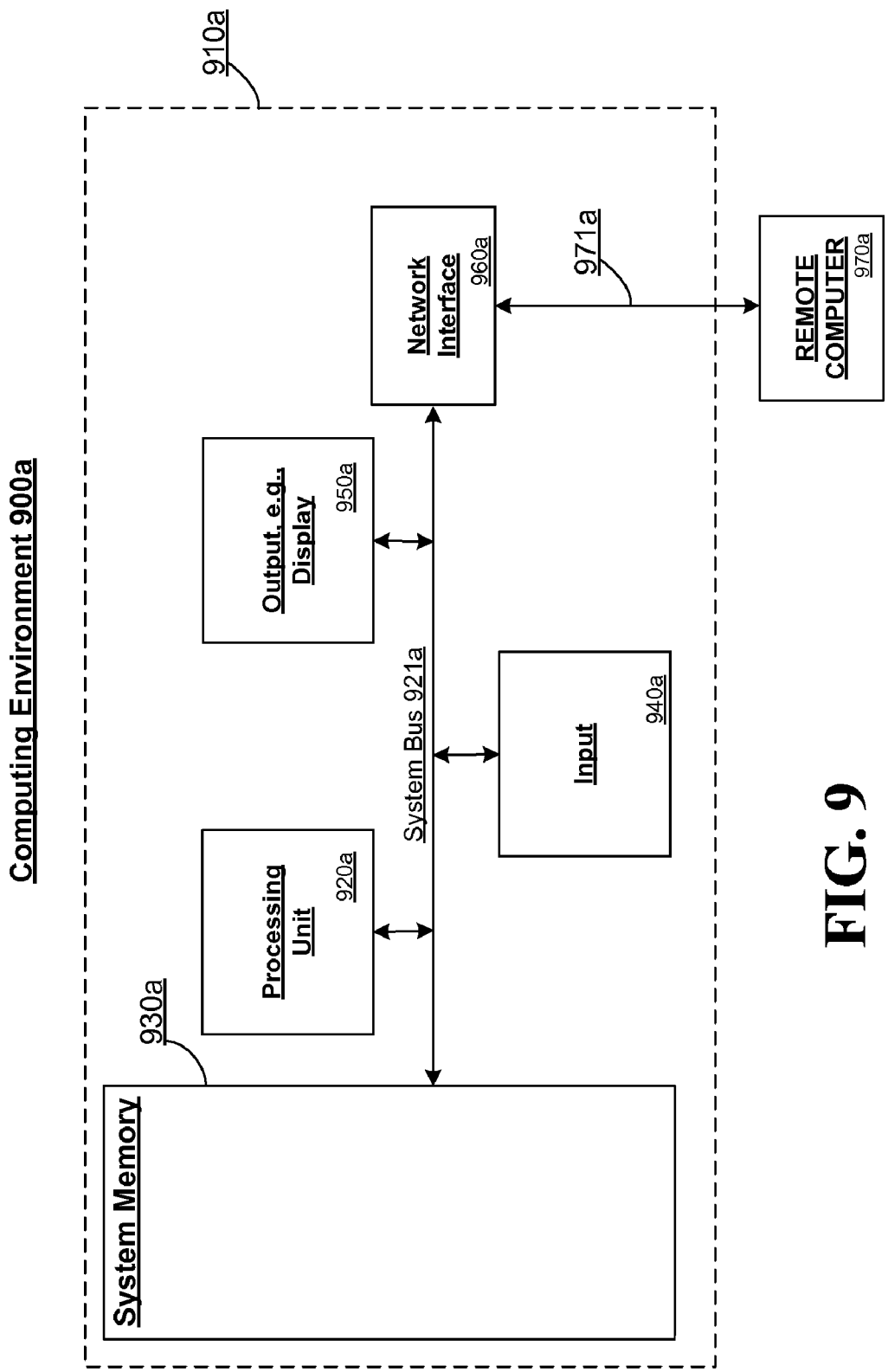
FIG. 9 is a block diagram representing an exemplary non-limiting computing system or operating environment in which the present invention may be implemented.

As mentioned, the invention applies to any device wherein it may be desirable to extract data from arbitrary data streams. It should be understood, therefore, that handheld, portable and other computing devices and computing objects of all kinds are contemplated for use in connection with the present invention, i.e., anywhere that a device may be monitored by a network engineer, or otherwise receive, process or store data. Accordingly, the below general purpose remote computer described below in FIG. 9 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 9 thus illustrates an example of a suitable computing system environment 900a in which the invention may be implemented, although as made clear above, the computing system environment 900a is only one example of a suitable computing environment for a media device and is not intended to suggest any limitation as to the scope of use or functionality of the invention. Neither should the computing environment 900a be interpreted as having any dependency or requirement relating to any one or combination of components illustrated in the exemplary operating environment 900a.

With reference to FIG. 9, an exemplary remote device for implementing the invention includes a general purpose computing device in the form of a computer 910a. Components of computer 910a may include, but are not limited to, a processing unit 920a, a system memory 930a, and a system bus 921a that couples various system components including the system memory to the processing unit 920a. The system bus 921a may be any of several types of bus structures including a memory bus or memory controller, a peripheral bus, and a local bus using any of a variety of bus architectures.

Computer 910a typically includes a variety of computer readable media. Computer readable media can be any available media that can be accessed by computer 910a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910a. Communication media typically embodies computer readable instructions, data structures, program modules or other data in a modulated data signal such as a carrier wave or other transport mechanism and includes any information delivery media.

The system memory 930a may include computer storage media in the form of volatile and/or nonvolatile memory such as read only memory (ROM) and/or random access memory (RAM). A basic input/output system (BIOS), containing the basic routines that help to transfer information between elements within computer 910a, such as during start-up, may be stored in memory 930a. Memory 930a typically also contains data and/or program modules that are immediately accessible to and/or presently being operated on by processing unit 920a. By way of example, and not limitation, memory 930a may also include an operating system, application programs, other program modules, and program data.

The computer 910a may also include other removable/non-removable, volatile/nonvolatile computer storage media. For example, computer 910a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 921a through a non-removable memory interface such as an interface, and a magnetic disk drive or optical disk drive is typically connected to the system bus 921a by a removable memory interface, such as an interface.

A user may enter commands and information into the computer 910a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 920a through user input 940a and associated interface(s) that are coupled to the system bus 921a, but may be connected by other interface and bus structures, such as a parallel port, game port or a universal serial bus (USB). A graphics subsystem may also be connected to the system bus 921a. A monitor or other type of display device is also connected to the system bus 921a via an interface, such as output interface 950a, which may in turn communicate with video memory. In addition to a monitor, computers may also include other peripheral output devices such as speakers and a printer, which may be connected through output interface 950a.

The computer 910a may operate in a networked or distributed environment using logical connections to one or more other remote computers, such as remote computer 970a, which may in turn have media capabilities different from device 910a. The remote computer 970a may be a personal computer, a server, a router, a network PC, a peer device or other common network node, or any other remote media consumption or transmission device, and may include any or all of the elements described above relative to the computer 910a. The logical connections depicted in FIG. 9 include a network 971a, such local area network (LAN) or a wide area network (WAN), but may also include other networks/buses. Such networking environments are commonplace in homes, offices, enterprise-wide computer networks, intranets and the Internet.

When used in a LAN networking environment, the computer 910a is connected to the LAN 971a through a network interface or adapter. When used in a WAN networking environment, the computer 910a typically includes a communications component, such as a modem, or other means for establishing communications over the WAN, such as the Internet. A communications component, such as a modem, which may be internal or external, may be connected to the system bus 921a via the user input interface of input 940a, or other appropriate mechanism. In a networked environment, program modules depicted relative to the computer 910a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for extracting data from data streams in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for extracting data from data streams of the invention. The invention contemplates the use of the invention from the standpoint of an API (or other software object), as well as from a software or hardware object that extracts data of interest from arbitrary data streams in accordance with the invention in a protocol-agnostic manner. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to extract data of interest from arbitrary data streams. For instance, the analysis engine of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the field extraction capabilities of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 2 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for extracting data fields of interest from data streams in a protocol-agnostic manner. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for extracting at least one data field from a stream of data received from a network, comprising:
    inputting at least one positive example of an instance of the at least one data field; and
    based on the at least one positive example, analyzing the stream of data received from the network to determine a first result set including at least one candidate for the at least one data field in the stream, wherein the analyzing is based on no knowledge or only partial knowledge of any protocol represented by the stream received from the network.

2. The method of claim 1, further including:
    at least one of designating at least one candidate of the first result set as incorrect or providing at least one positive example of an instance of the at least one data field, or both; and
    re-analyzing the stream of data based on the additional knowledge that the designated at least one incorrect candidate is incorrect, or the additional knowledge of the at least one positive example, or both, and generating a second result set that improves the performance over said first result set.

3. The method of claim 2, further including:
    utilizing each of said at least one designated incorrect candidates as a negative example of an instance of the at least one data field when performing said re-analyzing.

4. The method of claim 2, further including:
    iteratively performing said designating, providing, or both, and re-analyzing steps until a user is satisfied with a subsequent result set.

5. The method of claim 1, further including:
    automatically generating a plurality of negative examples of instances of the at least one data field for use by said analyzing step when determining the first result set.

6. The method of claim 5, wherein said automatically generating includes generating a non-exhaustive plurality of negative examples according to a pre-determined algorithm to reduce the number of negative examples utilized during said analyzing step.

7. The method of claim 1, further including:
    automatically generating a plurality of features based on the at least one positive example from which a plurality of classifiers are formed.

8. The method of claim 7, further including:

combining and weighting the plurality of classifiers to generate optimal results in said first result set.

9. The method of claim 8, further including:

ascribing a weight associated with said at least one designated incorrect candidate higher than a weight associated with any randomly generated negative examples to emphasize the certainty of the at least one designated incorrect candidate as designated by the user.

10. A computer readable medium comprising computer executable instructions for performing the method of claim 1.

11. A method for automatically generating features for classifying data in a data stream, comprising:

specifying an item of interest in example data of the data stream; and automatically generating a plurality of features from the specified item, wherein the item and the plurality of features are used to form classifiers for classifying data in the data stream.

12. The method of claim 11, wherein said generating includes intelligently generating said plurality of features based on the item of interest by eliminating features that are less likely to form useful classifiers.

13. The method of claim 11, wherein said specifying includes specifying an offset and a field length for the item in the example data.

14. The method of claim 13, wherein said generating includes automatically generating negative examples from the positive example.

15. A computing device comprising means for performing the method of claim 11.

16. A computing device for automatically extracting data of interest from a binary stream of data received or stored by the computing device without reference to full knowledge of the structure of any protocol of the binary stream of data, comprising:

an analysis engine for analyzing the binary stream based on at least one classifier formed from at least one positive example of the data of interest provided to the analysis engine to determine a result set including at least one candidate from the binary stream of data as a potential match for the data of interest; and a user interface for outputting the result set and for receiving either at least one additional positive example or a designation of at least one candidate of the result set as an incorrect match for the data of interest, or both, wherein the analysis engine re-analyzes the binary stream based on the at least one additional positive example, or the at least one designated candidate, or both, to revise the at least one classifier and improve the accuracy of the result set.

17. The computing device of claim 16, wherein the analysis engine iteratively re-determines the result set based on iterative receiving by the user interface of designations of at least one candidate of the result set as an incorrect match for the data of interest.

18. The computing device of claim 16, wherein the analysis engine automatically analyzes the binary stream based on at least one classifier formed from a plurality of negative examples automatically generated from the at least one positive example.

19. The computing device of claim 18, wherein the plurality of negative examples are generated according to a predetermined algorithm that generates a non-exhaustive number of negative examples.

20. The computing device of claim 16, wherein the positive example is specified by an offset and a field length.

* * * * *